UNITED STATES PATENT OFFICE.

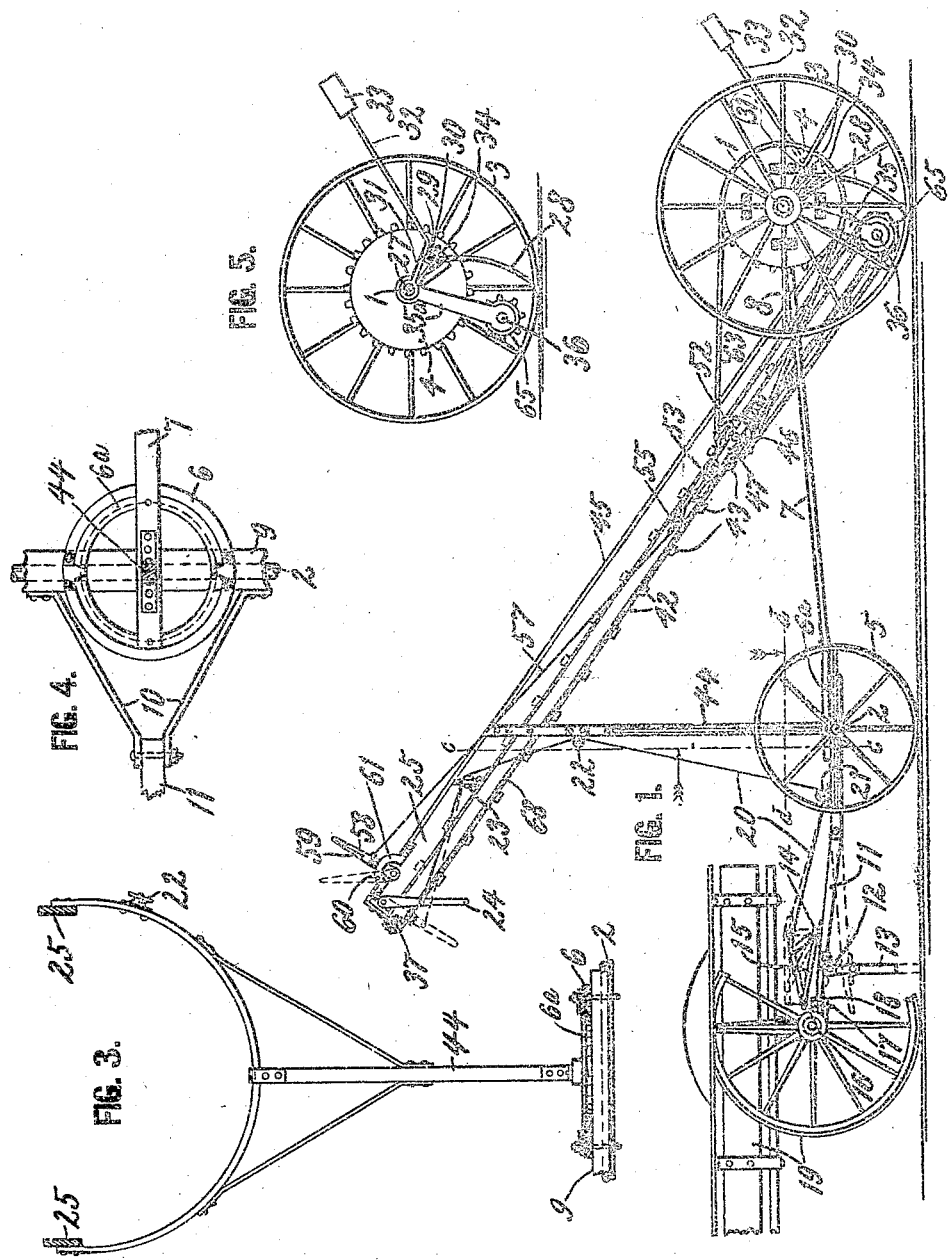
LE ROY HOWE.
HAY LOADER.
APPLICATION FILED NOV. 25, 1907.
935,986.
Patented Oct. 5, 1909.
2 SHEETS—SHEET 1.

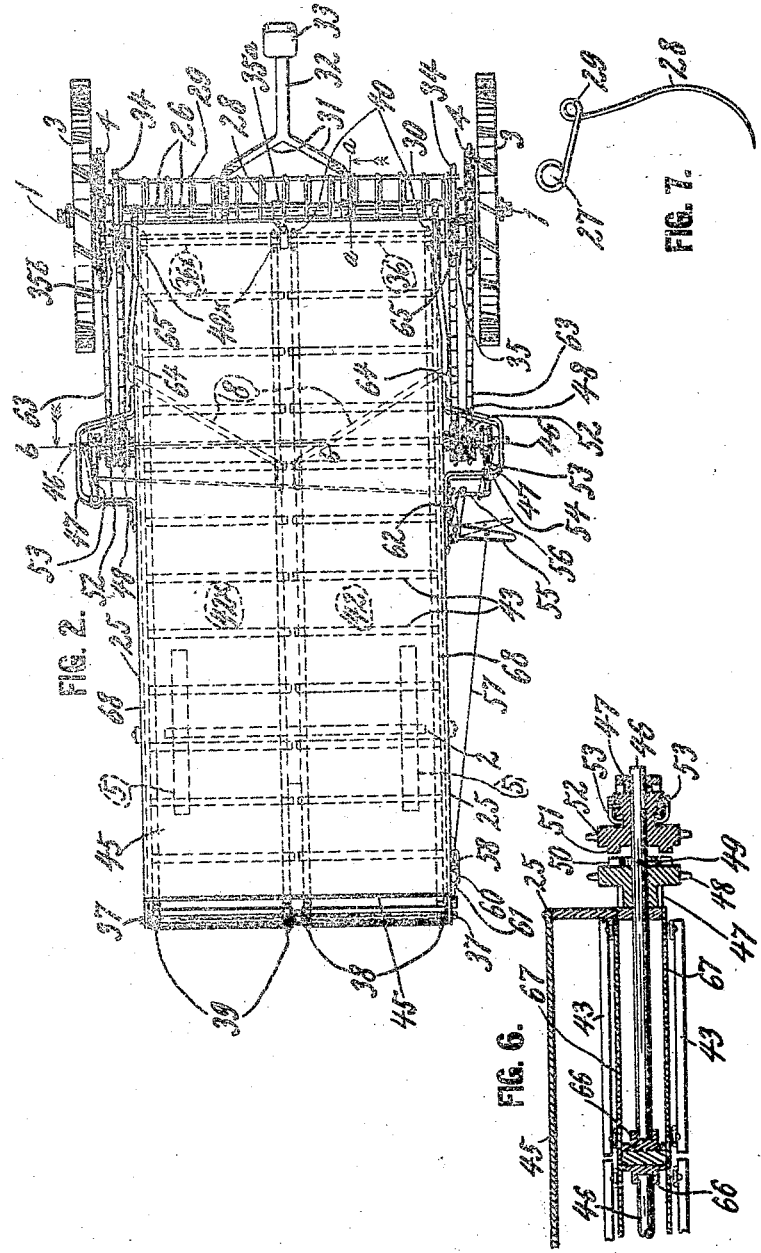

LE ROY HOWE, OF WAUPUN, WISCONSIN.

HAY-LOADER.

935,986.

Specification of Letters Patent. Patented Oct. 5, 1909.

Application filed November 25, 1907. Serial No. 403,837.

*To all whom it may concern:*

Be it known that I, LE ROY HOWE, a citizen of the United States, residing at Waupun, in the county of Fond du Lac and State of Wisconsin, have invented a new and useful Hay-Loader, of which the following is a specification.

My invention relates to hay loading devices of the kind that are mounted on wheels, are attachable to the rear end of hay racks and rake up and deliver the hay into the rack. And the object is to provide an improved and convenient hay loader of said class.

In the accompanying drawings: Figure 1 is a side elevation of my improved hay loader attached to the rear portion of a hay rack. Fig. 2 is a top view of the loader. Fig. 3 is a sectional front elevation on the line $c-c$ in Fig. 1. Fig. 4 is a horizontal sectional top view on line $d-d$ in Fig. 1, with many parts omitted. Fig. 5 is a partly sectional elevation on the line $a-a$ in Fig. 2. Fig. 6 is a transverse section on the line $b-b$ in Fig. 2 with the shaft 46 made in two parts as a modification. Fig. 7 is a detail view of one of the teeth raking up the hay.

Referring to the drawing by reference numerals, 1 designates the rear axle and 2 the front axle of the loader. The rear axle is supported by two traction wheels 3, journaled on the shaft and having each secured upon its inner side a sprocket 4. The front axle is supported by smaller wheels 5, which preferably have a narrower gage than the hind wheels.

As best shown in Fig. 4, upon the front axle is mounted a fifth-wheel 6, to whose swiveling member 6ª is secured to and supports the front end of a reach 7, having its rear end formed with two arms 8, which are secured to the rear axle 1. To the front axle 2, or a bolster 9 fixed thereon, is secured by bracing arms 10 a tongue 11, to whose front end is pivoted at 12 a depending prop 13, which is normally hanging about eight inches from the ground, but when the tongue is uncoupled from the hay rack and allowed to sink some, the prop supports it so it does not fall to the ground. Upon the front end of the tongue is pivoted at 14 a bell-crank lever 15, from the long arm of which is suspended by a short chain 16 a coupling pin 17, adapted for insertion downwardly into a coupling member 18, fixed on the rear part of the hay rack 19, and in a hole in the front end of the tongue 11, after the latter is inserted in the coupling member. To the other arm of the lever is fixed one end of a cord 20, which is guided by sheaves 21, 22, 23 and has its other end attached to a hand lever 24; which is pivoted to the upper end of the carrier frame 25, so that a workman standing on the top of the hay load may take hold of the lever and uncouple the rack whenever the rack is full, or there is no more hay to be loaded.

The hay is raked up from the ground and carried upward and deposited into the rack by the following means. Upon the rear axle 1 are placed between collars 26, the loops 27 (see Fig. 7) of a series of rake teeth 28, having each a second loop 29, through which is inserted a bar 30. Said bar is secured in the two arms 31 of a lever 32, which is impelled downward by a weight 33, which, as the arms 31 are journaled on the shaft 1, causes the bar 30 to impel all the teeth downward as close to the ground as desired and as regulated by two arms 34, which are fixed on the axle and normally support the bar 30. On the axle 1 are also mounted three downwardly extending arms 35, 35ª, 35ᵇ, in the outer two of which are journaled the outer ends of two axially arranged shafts 36 and 36ˣ, whose inner ends are journaled in the bearing 35ª. Said two shafts are also journaled in the lower end of the carrier frame 25, in whose upper end is journaled a shaft 37, on which are fixed two sprocket wheels 38 and placed loose sprockets 39, while on each of the lower shafts 36 and 36ˣ are fixed two sprockets 40 or 40ˣ. Moved by said lower shafts and sprockets are two endless carriers 42 and 42ˣ stretched parallel to and near each other over said upper and lower sprockets, and having cleats 43 to engage the hay. Said carrier frame is supported with its front end upon the reach 7 by a prop 44 (best shown in Fig. 3); and the carrier frame has a light cover 45 to prevent the wind from blowing the hay away from the carriers. A short distance from the lower end of the carrier frame is secured in it a transverse shaft 46, whose ends are supported in brackets 47 and serve each of them as a stud for a coupling mechanism, which, as best shown in Fig. 6, consists of a sprocket 48 retained in place by a pin 49 in the stud, and having at one side clutch teeth 50 adapted to be engaged by similar teeth 51, of a sprocket 52, which in its hub is provided with an annular groove for a shifter 53 to engage. Said shifter is pivoted at 54 to the bracket 47 and is operated by a lever 55 mounted on the carrier frame and connected by a link rod 56 to the shifter. Said link rod extends through the frame to the opposite shifter 53, which it engages rearwardly of its pivot, so that the rod moves the two shifters simultaneously in opposite directions. The lever 55 may also be operated by a cord 57, and a lever 58 mounted at the upper end of the carrier frame and held, alternately, in one position by a latch 59 engaging in a notch 60 in the segmental bracket 61, and in another position by a pulling coil spring 62, which pulls on the lower lever when the upper one is released from the said notch.

63 are link belts by which the sprockets 4 drive the sprockets 52; and 64 are link belts by which sprockets 48 drive sprockets 65, which are fixed one on each shaft 36 and 36ˣ.

From the above description it will be understood that in operating the machine the person standing on the hay-load to spread the hay on the rack may, whenever he so desires, operate the lever 58, so as to start and stop the carriers while the chains 63 are in motion. It will also be understood that each carrier is so far independent of the other, that when the machine is turned to one side or the other on the field, so that one of the traction wheels 3 revolves faster than the other, or even stands still, each carrier will move fast or slow according as the traction wheel revolves, that drives it. It is further understood that the rack with loading device attached is drawn by draft animals or other motive power (not shown); and that the loader is wide enough to take up two windrows or swaths of hay at one time.

In Fig. 6 is shown that the shaft 46 may be divided in the middle or even farther apart and have the inner ends supported in bearings 66, secured to the flat portions 67 of the carrier frame 25.

68 are endless chains to which the cleats 43 of the carriers are secured. The hay may be moved upward on the face of the upper board 67 in Fig. 6 by the chains and cleats only, or the carrier may also have a canvas secured along the inner sides of the cleats. Such canvas being a well known means I have not shown it. The lower board 67 in Fig. 6 may be dispensed with if the frame is otherwise firmly constructed.

Referring further to the operation, it will be understood that each tooth 28 of the rake passes close to the ground and gathers the hay into elevating contact with the carriers, and that in meeting obstructions on the ground each tooth has both a yielding spring motion in its body and in the loop 29, and a play on the bar 30, so that only great obstructions will require the lifting of the bar 30 and weight 33. In driving the machine idle over uneven ground the teeth may be raised by swinging the arm 32 with its weight 33 forward and let it rest upon the carriers.

Having now described my invention, what I claim as new is:—

1. In a hay loader, an axle, a pair of traction wheels journaled one on each end of the axle, a sprocket wheel secured to each traction wheel an inclined carrier frame supported by its rear end below said axle, two parallel endless carriers arranged in said frame and means for operating each carrier frame and means for operating each carrier by one of the sprocket wheels on the traction wheels; rake teeth adjacent the rear of the carriers, means for supporting the front end of the carrier frame in a higher position than the rear end and means for coupling the loader to a hay rack; said supporting means for the carrier frame consisting of a front axle, a supporting wheel at each end thereof, a fifth-wheel upon the axle, a reach extending from the rear axle and secured to the swiveling member of the fifth-wheel, and a prop supported on the reach and supporting the carrier frame; and said means for attaching the loader to the rack consisting of a tongue extending from the said front axle and means at its front end for coupling it to the hay rack.

2. In a hay loader, an axle, a pair of traction wheels journaled one on each end of the axle, a sprocket wheel secured to each traction wheel, an inclined carrier frame supported by its rear end below said axle, two parallel endless carriers arranged in said frame and means for operating each carrier, by one of the sprocket wheels on the traction wheels; rake teeth adjacent the rear of the carriers, means for supporting the front end of the carrier frame in a higher position than the rear end, and means for coupling the loader to a hay rack; said means for operating the carriers by the sprocket wheels consisting of two independent shafts journaled in the lower end of the carrier frame, two sprockets fixed on each of them and engaging the carriers, a sprocket fixed near the end of each shaft, shafts or studs one at each side of the carrier frame, two sprockets on each stud, one of them being fixed on each stud and both sprockets having clutch teeth by which one may engage the other, an endless link-belt from each sprocket on the traction wheels to one of said clutch sprockets, a link belt from each of the other clutch sprockets to one of the sprockets fixed on the carrier shafts, means for preventing sliding movement of one of the clutch sprockets, shifters engaging the other clutch sprockets to slide them on the studs, a rod connecting the two shifters to cause them to operate in like manner simultaneously, and a hand lever for operating said rod.

3. In a hay loader of the kind described, the combination with the rear axle 1, of a series of collars thereon, rake teeth inserted between the collars and having each an eye encircling the axle, and a second eye upon its body, a bar loosely inserted in all of said second eyes, a weighted lever pivoted on the axle and secured to the bar so as to hold it and the teeth yieldingly downward when the lever is inclined upwardly and rearwardly, and to hold them elevated from the ground when the lever is inclined forwardly and upwardly, and means for supporting said bar at the desired elevation when the rake teeth are in operative position on the ground; said lever being so disposed that it rests against some part of the machine when in its forwardly and upwardly inclined position.

In testimony whereof I affix my signature, in presence of two witnesses.

LE ROY HOWE.

Witnesses:
G. U. PEPPER,
G. A. BENSON.